United States Patent [19]
Compton

[11] Patent Number: 6,116,649
[45] Date of Patent: Sep. 12, 2000

[54] SEAT BELT RETAINER

[76] Inventor: Donald Lee Compton, 204 36th Pl., Snyder, Tex. 79549

[21] Appl. No.: 09/109,030

[22] Filed: Jul. 1, 1998

[51] Int. Cl.[7] .................................................. B60R 22/20
[52] U.S. Cl. ..................... 280/801.2; 297/481; 280/749
[58] Field of Search ............................ 280/801.2, 801.1, 280/749; 24/633, 634, 265 C, 265 CD; 297/481, 468

[56] References Cited

U.S. PATENT DOCUMENTS

| | | | |
|---|---|---|---|
| 2,545,540 | 3/1951 | Beuck | 24/10 |
| 3,287,061 | 11/1966 | Nicholas | 297/385 |
| 4,190,955 | 3/1980 | Rushforth | 30/366 |
| 5,131,682 | 7/1992 | Reed | 280/801 |
| 5,573,167 | 11/1996 | Bebb et al. | 224/666 |
| 5,619,774 | 4/1997 | Perry | 24/3.6 |
| 5,867,874 | 2/1999 | Simpson | 24/336 |
| 5,898,366 | 4/1999 | Brown et al. | 340/457.1 |

*Primary Examiner*—Paul N. Dickson
*Assistant Examiner*—Tony Winner
*Attorney, Agent, or Firm*—Royston, Rayzor, Vickery, Novak, & Druce, L.L.P.

[57] ABSTRACT

A retainer 30 for a seat belt strap assembly 81 that includes an anchor body 35 having a securement portion 45 and a seat belt engagement portion 79. The securement portion 45 is adapted for being releasably mountable upon a front side panel 92 of a vehicle passenger seat 90. The seat belt engagement portion 79 is adapted for releasable engagement with the seat belt assembly member 84. The securement portion 45 is alternatively substantially U-shaped or J-shaped with an interior leg 50 adapted for abutting engagement with an interior surface 94 of a front side panel 92 of a vehicle passenger seat 90 and an exterior leg 60 adapted for abutting engagement with an exterior surface 96 of the same front side panel 92 of the vehicle passenger seat 90. In the J-shaped configuration, however, the interior leg 50 is shorter than the exterior leg 60. In this manner, when the retainer 30 is in a mounted configuration, the front side panel 92 of the vehicle passenger seat 90 is pinched between the interior and exterior leg 60s. A bite portion 65 connects the interior leg 50 to the exterior leg 60 and orients the interior leg 50 substantially parallel to the exterior leg 60 when in an relaxed or uninfluenced configuration. At least the bite portion 65 is constructed from a resiliently flexible material so that the relaxed configuration is biased toward when deformed therefrom. At least one barb 70, is positioned upon one of the legs of the securement portion 45 for biting engagement upon a front side panel 92 of the vehicle passenger seat 90 when in a mounted thereupon.

17 Claims, 4 Drawing Sheets

SEAT BELT RETAINER

FIELD OF THE INVENTION

This invention relates generally to vehicle seat belt equipment. More specifically, this invention pertains to a seat belt retainer used to secure unused strap assemblies or to restrain light cargo loads in conjunction with the strap assemblies when the seat belt equipment is not in use to restrain vehicle occupants.

BACKGROUND OF THE INVENTION

Typically, one type of vehicle seat belt equipment consists of a retainer and a strap assembly. The retainer consists of an anchor connecting the retainer to the vehicle; a short strap or cable connected to the anchor; and a buckle connected to the short strap or cable. The strap assembly may be of two types: retractable or non-retractable. Both types of strap assemblies consist of an anchor connecting the strap assembly to the vehicle; the strap (retractable or non-retractable) connected to the anchor; and a tongue which mates with the buckle.

The need for securing unused strap assemblies is often encountered by vehicle operators and others. This need can arise in the front or back seats of vehicles. Oftentimes, the unused strap assembly lies loosely on the seat and it is not unusual for it to fall down between the seat cushions or become bunched up and twisted. To avoid this problem, retractable strap assemblies have been used to temporarily retract unused strap assemblies away from the seating area. Retractable strap assembles, however, are susceptible to jamming. Further, existing devices are not usually configured to be movable along the front face of the vehicle seat nor take advantage of the existing strap assembly tongue to secure the unused seat belt equipment.

Additionally, a need often arises to restrain light cargo loads placed in a vehicle's seat. Conventional seat belt equipment is not well adapted to such a use.

Therefore, in view of these needs and potential benefits to be enjoyed in these areas, the present invention has been designed and developed.

SUMMARY OF THE INVENTION

The seat belt retainer of the present invention enjoys several benefits over presently available devices and methods for securing strap assemblies while not in use or restraining light cargo loads as an auxiliary utilization. These benefits are attributable to, among other aspects, the design of the seat belt retainer and the positioning of a buckle at the front face of the seat by means of a movable anchor. The seat belt buckle engages the tongue of the unused strap assembly to secure the strap assembly against the top face of the seat or to secure light cargo loads upon the top surface of the seat. The nature of the seat belt retainer of the present invention permits the buckle to be positioned anywhere along the front face of the seat by utilizing a movable anchor. Because of the positioning of the buckle at the front face of the seat, the tongue of the strap assembly can be clipped into the buckle and the strap assembly adjusted so that it is positioned taut and securely across the top face of the seat or over the cargo to be secured. In order to enhance the ease of anchoring the retainer to the front face of the seat, the movable anchor can be in the form of a substantially "U" or "J" shaped flexible but resilient clasping device with at least one downward pointing barb on the inner surface and an opening slightly less than the thickness of the vehicle seat cushion.

From the benefits described hereinabove regarding both the construction and use of the present invention, it is obvious that commercial applications and uses will be plentiful in both vehicle industries, as well as others in which the securing of unused strapping is required.

DESCRIPTION OF THE DRAWINGS AND ILLUSTRATIVE PHOTOGRAPHS

DESCRIPTION OF THE INVENTION

Figure 1:
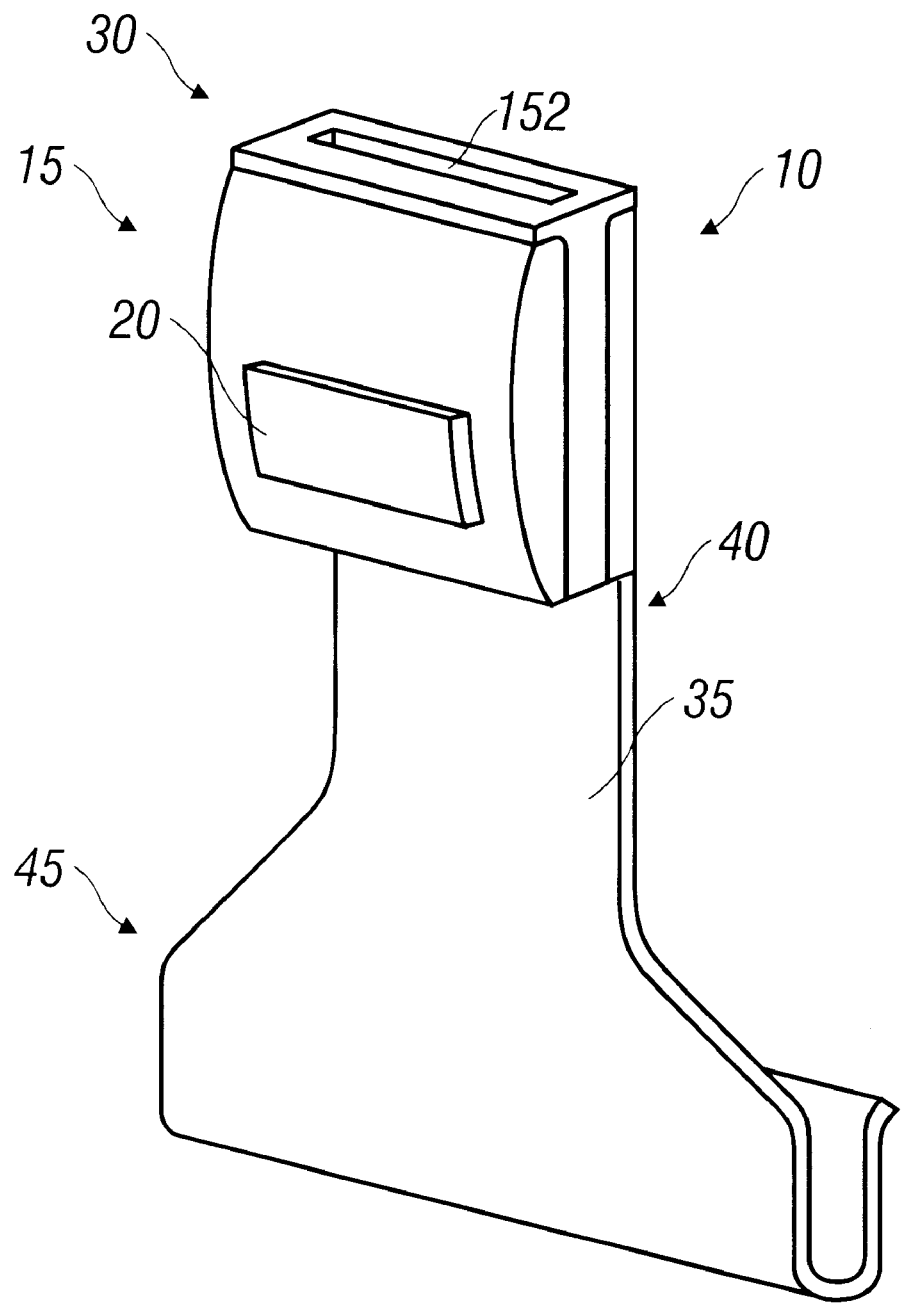
FIG. 1 is a front perspective view of an exemplary embodiment of the seat belt retainer according to the present invention.
Figure 2:
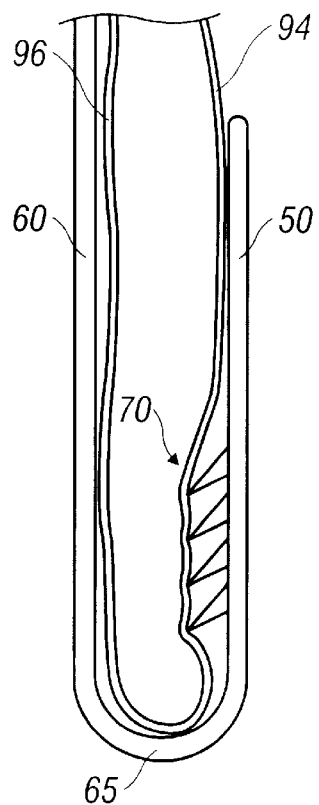
FIG. 2 is a side elevation view of a U-shaped movable anchor.
Figure 3:
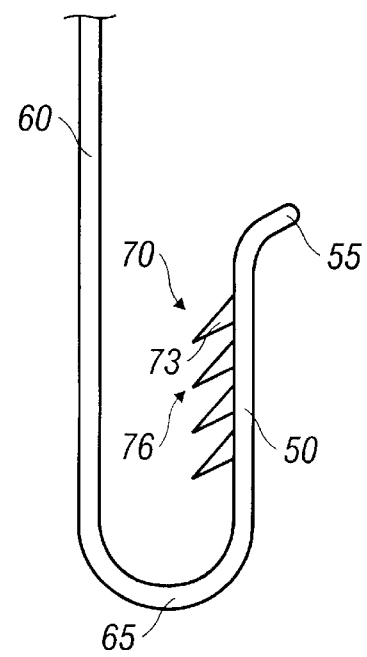
FIG. 3 is a side elevation view of a J-shaped movable anchor.
Figure 4:
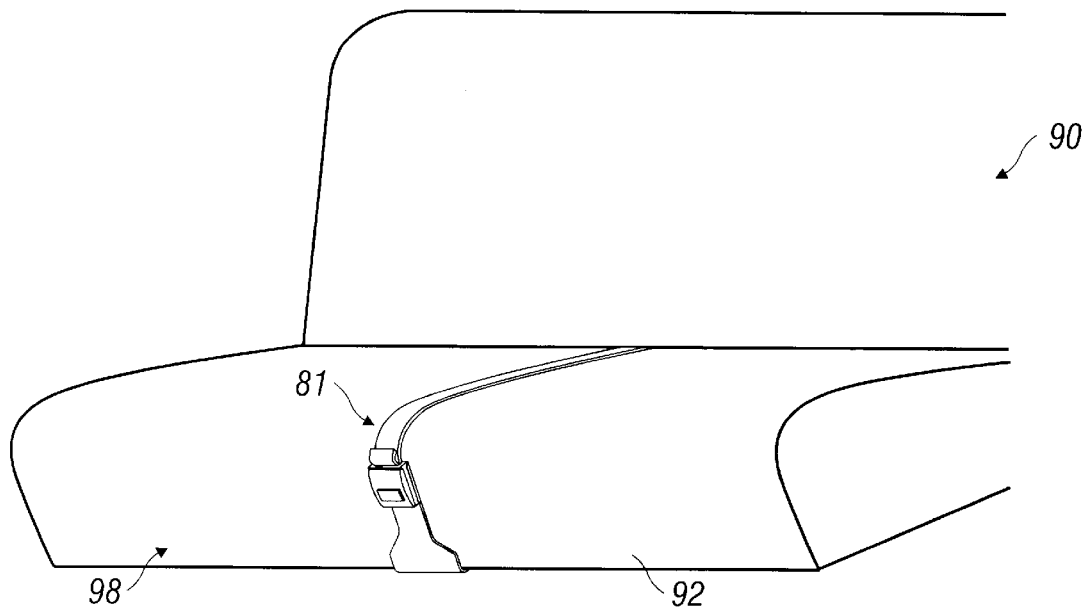
FIG. 4 is an perspective view of the seat belt retainer employed to secure an unused strap assembly at a seat front face while the seat belt equipment is not in use to restrain vehicle occupants.
Figure 5:
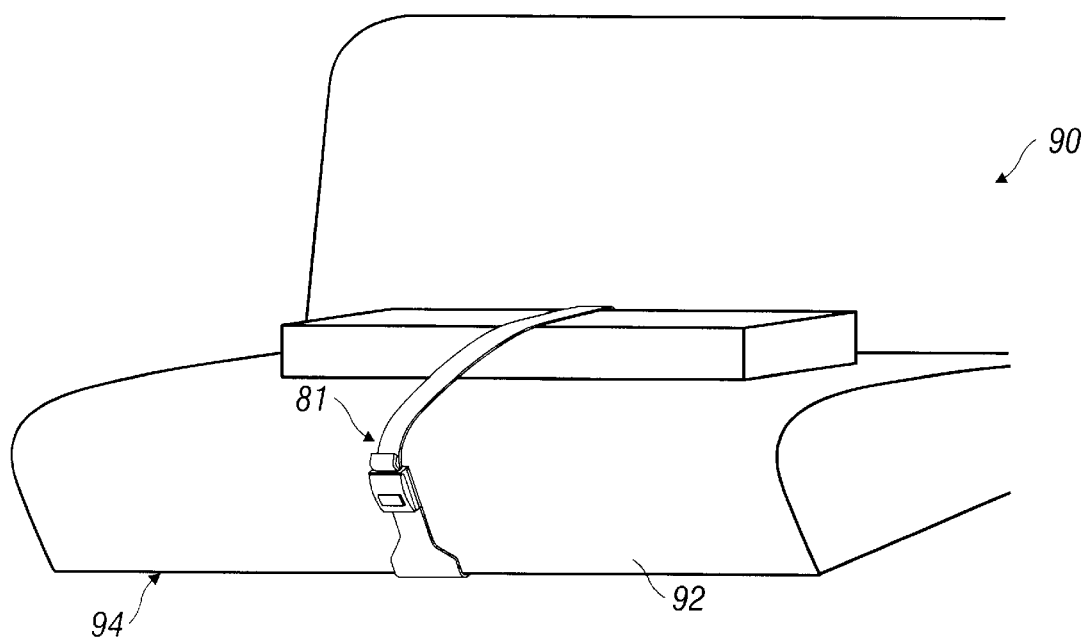
FIG. 5 is a perspective view of the seat belt retainer employed in conjunction with a strap assembly to restrain a light cargo load when the seat belt equipment is not in use to restrain vehicle occupants.

In at least one embodiment, the present invention is an retainer 30 for a seat belt strap assembly 81. The retainer 30 includes an anchor body 35 having a securement portion 45 and a buckle 15. The securement portion 45 is adapted for being releasably mountable upon a front side panel 92 of a vehicle passenger seat 90. The buckle 15 is adapted for releasable engagement with the seat belt assembly member 84.

In one instance, the securement portion 45 is substantially U-shaped with an interior leg 50 adapted for abutting engagement with an interior surface 94 of a front side panel 92 of a vehicle passenger seat 90 and an exterior leg 60 adapted for abutting engagement with an exterior surface 96 of the same front side panel 92 of the vehicle passenger seat 90. In this manner, when the retainer 30 is in a mounted configuration, the front side panel 92 of the vehicle passenger seat 90 is pinched between the interior leg 50 and exterior leg 60. In an alternative, the securement portion 45 is substantially J-shaped, instead of U-shaped, but still has an interior leg 50 adapted for abutting engagement with an interior surface 94 of a front side panel 92 of a vehicle passenger seat 90 and an exterior leg 60 adapted for abutting engagement with an exterior surface 96 of the same front side panel 92 of the vehicle passenger seat 90 so that when the retainer 30 is in a mounted configuration, the front side panel 92 of the vehicle passenger seat 90 is pinched between the interior leg 50 and exterior leg 60. In the J-shaped configuration, however, the interior leg 50 is shorter than the exterior leg 60.

A bite portion 65 connects the interior leg 50 to the exterior leg 60 and orients the interior leg 50 substantially parallel to the exterior leg 60 when in an uninfluenced or relaxed configuration; that is when the retainer 30 is not being deformed. The bite portion 65 is constructed from a resiliently flexible material so that the uninfluenced configuration is biased toward when deformed therefrom.

At least one barb 70, and preferably a plurality of barbs are positioned upon one of the legs of the securement portion 45 for biting engagement upon a front side panel 92 of the vehicle passenger seat 90 when in a mounted thereupon. In one example, each barb 70 is positioned upon the interior leg 50 of the securement portion 45 for biting engagement upon the front side panel 92 of the vehicle passenger seat 90. Exemplarily, each of the plurality of barbs includes a base 73 connected upon the interior leg 50 and a tip 76 distally located from the base 73 and oriented so that the tip 76 is positioned closer to the bite portion 65 than is the base 73 for resisting unintentional disengagement of the retainer 30 from a front side panel 92 of a vehicle passenger seat 90 when in a mounted configuration. Still further, the interior leg 50 has an outwardly turned upper lip 55 for facilitating mounting of the retainer 30 upon the front side panel 92 of a vehicle passenger seat 90.

The securement portion 45 includes a buckle 15 for releasably engaging a tongue insert 87 of the seat belt strap assembly 81. The buckle 15 has a push-button release 20 for permitting disengagement of an inserted tongue 87 from the buckle 15. The push-button release 20 includes a ramp-shaped catch 25 for insertion into a receiving aperture of a tongue insert 87 and the release 20 is spring biased toward a configuration for securement to a seat belt assembly member 84. Still further, the buckle 15 is positioned upon a top end of the anchor body 35 opposite the securement portion 45.

Figure 6:
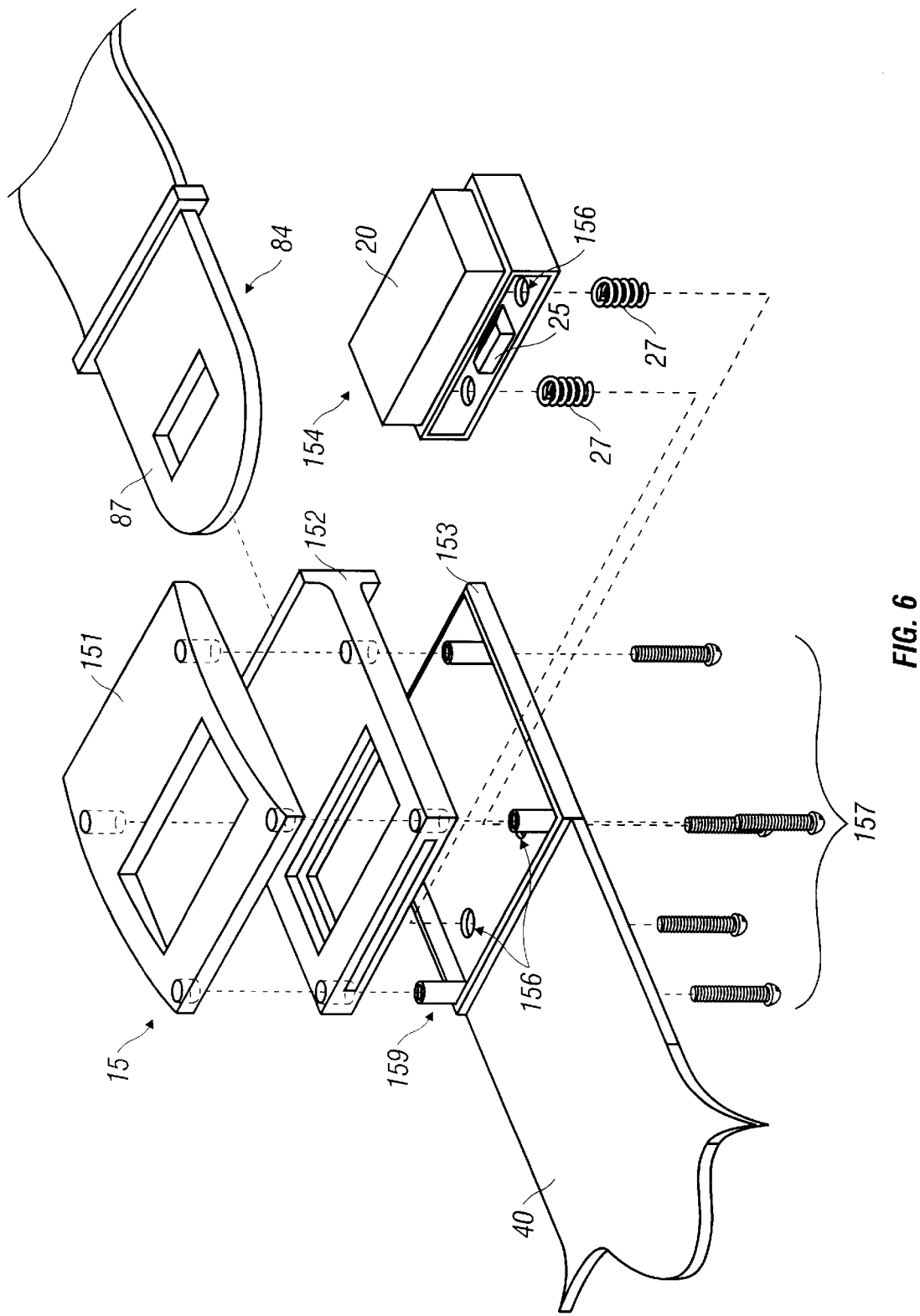
FIG. 6 is an exploded assembly view of the buckle portion of the seat belt retainer.

FIG. 6 is an exploded view of the buckle 15. It consists of a front cover 151, receiver 152, and back portion 153 molded together with the top end of the anchor 40. The engage/release mechanism 154 is also shown including two actuating springs 27 molded into the engage/release mechanism 154. The outside diameter of the spring retainers 156 has a raised lip, and the inside diameter of the spring retainers 156 is the same as the outside diameter of the actuating springs 27 with identical retainers molded into the back 153. The entire buckle is assembled by the use of four retaining screws 157. The top end of the anchor 40 is designed to accommodate the front side panel 92 of a vehicle passenger seat 90.

The front cover 151 is molded with a rectangular opening which allows the upper portion of the engage/release mechanism 154 to protrude through the opening, creating the push-button 20 for the engage/release mechanism 154. The upper portion of the engage/release mechanism has been reduced in size to prevent the entire engage/release mechanism 154 from extraction through the rectangular opening in the front cover 151. Four cylindrical retaining screw receivers are molded into the front cover 151 and the back 153 so they meet halfway through the cylindrical openings in the receiver 152 thus preventing the front cover 151, the receiver 152 and the back 153 from becoming misaligned.

The receiver 152 is molded in one piece with the inside hollow to allow the insertion of a standard seat belt assembly tongue insert 87. A rectangular opening, aligned with the rectangular opening in the front cover 151 and equal to the outside dimensions of the engage/release mechanism 154 provides an opening through which the engage/release mechanism 154 passes. Four cylindrical openings are molded into the receiver 152 which align with the retaining screw receivers 159 on the front cover 151. The top part of the receiver 152 is enlarged and tapered toward the center to facilitate the insertion of a standard seat belt tongue insert 87.

The back portion 153 is molded with a recessed area. This allows the engage/release mechanism to operate back and forth engaging and releasing a standard seat belt tongue insert 87. Four cylindrical retaining screw receivers 159 are molded on the outside perimeter of the back portion 153. Two spring retainers 156 are molded into the back portion 153 as previously described.

The engage/release mechanism 154 is molded slightly smaller than the rectangular opening in the receiver 152 thus allowing it to pass through this opening. The push-button portion 20 of the engage/release mechanism 154 is slightly smaller than the rectangular opening in the front cover 151. The lower body of the engage release mechanism is molded hollow with a ramp-shaped catch 25 molded in the bottom. By pressing the push-button portion of the engage/release mechanism the seat belt tongue insert 87 is released from the buckle. In its natural state, upward tension is placed on the engage/release mechanism 154 by two actuating springs 155 located between the engage/release mechanism 154 and the back portion 153.

The present invention also includes the unique method for anchoring a motor vehicle passenger seat belt strap assembly 81 facilitated by the above describe structure. The method includes installing a retainer 30 upon a front side panel 92 of a vehicle passenger seat 90 where the retainer 30 has a securement portion 45 and a buckle 15. A seat belt assembly member 84 is inserted into a buckle 15 of the retainer 30 for securing a strap portion of the seat belt strap assembly 81 across a top surface of the vehicle passenger seat 90. The anchor body 35 is clipped about a lower edge of the front side panel 92 of the vehicle passenger seat 90 thereby pinching the panel 92 between the interior leg 50 and exterior leg 60 of the securement portion 45. At least one barb 70 is engaged upon the front side panel 92 of the vehicle passenger seat 90 thereby resisting inadvertent disengagement of the retainer 30 from the front side panel 92 of the vehicle passenger seat 90. Ultimately, the strap portion of the seat belt strap assembly 81 is tightened so that the seat belt strap assembly 81 is drawn taut across the top surface of the vehicle passenger seat 90.

What is claimed and desired to be secured by Letters Patent is as follows:

1. A retainer for a seat belt strap assembly, said retainer comprising:
   an anchor body having a securement portion and a seat belt engagement portion, said securement portion being adapted for being releasably mountable upon a front panel of a vehicle passenger seat and said seat belt engagement portion adapted for releasable engagement with a seat belt assembly member, said securement portion having a buckle for releasably engaging a tongue insert of the seat belt strap assembly member; and
   said buckle further comprises a push-button release for permitting disengagement of the tongue insert from said buckle, said push-button release being spring biased toward a configuration for securement to the seat belt assembly member.

2. The retainer as recited in claim 1; wherein said securement portion is substantially U-shaped with an interior leg adapted for abutting engagement with an interior surface of a front side panel of a vehicle passenger seat and an exterior leg adapted for abutting engagement with an exterior surface of the same front side panel of the vehicle passenger seat so that when said retainer is in a mounted configuration the front side panel of the vehicle passenger seat is pinched between said interior and exterior legs.

3. The retainer as recited in claim 1; wherein said securement portion is substantially J-shaped with an interior leg adapted for abutting engagement with an interior surface of a front side panel of a vehicle passenger seat and an exterior leg adapted for abutting engagement with an exterior surface of the same front side panel of the vehicle passenger seat so that when said retainer is in a mounted configuration the front side panel of the vehicle passenger seat is pinched between said interior and exterior legs.

4. The retainer as recited in claim 3; said retainer further comprising:

a bite portion connecting said interior leg to said exterior leg and orienting said interior leg substantially parallel to said exterior leg in an relaxed configuration, said bite portion being constructed from a resiliently flexible material so that said relaxed configuration is biased toward when deformed therefrom.

5. The retainer as recited in claim 3; said retainer further comprising:

at least one barb positioned upon one of said legs of said securement portion for biting engagement upon a front side panel of a vehicle passenger seat when in a mounted configuration.

6. The retainer as recited in claim 5; wherein said at least one barb is positioned upon said interior leg of said securement portion for biting engagement upon a front side panel of a vehicle passenger seat when in a mounted configuration.

7. The retainer as recited in claim 6; wherein said at least one barb is a plurality of barbs, each of said plurality of barbs oriented for biting engagement upon a front side panel of a vehicle passenger seat when in a mounted configuration.

8. A retainer for a seat belt strap assembly, said retainer comprising:

an anchor body having a securement portion and a seat belt engagement portion, said securement portion being adapted for being releasably mountable upon a front panel of a vehicle passenger seat and said seat belt engagement portion adapted for releasable engagement with a seat belt assembly member;

wherein said securement portion is substantially J-shaped with an interior leg adapted for abutting engagement with an interior surface of the front panel of a vehicle passenger seat and an exterior leg adapted for abutting engagement with an exterior surface of the same front panel of the vehicle passenger seat so that when said retainer is in a mounted configuration the front side panel of the vehicle passenger seat is pinched between said interior and said exterior legs;

wherein a plurality of barbs are positioned upon said interior leg of said securement portion for biting engagement upon the front side panel of the vehicle passenger seat when in a mounted configuration and each of said plurality of barbs further comprises:

a base connected upon said interior leg; and a tip distally located from said base and oriented so that said tip is positioned closer to said bite portion than is said base for resisting unintentional disengagement of said retainer from a front side panel of a vehicle passenger seat when in a mounted configuration.

9. The retainer as recited in claim 3; said interior leg further comprises:

an outwardly turned upper lip for facilitating mounting of said retainer upon a front side panel of a vehicle passenger seat.

10. A retainer for a seat belt strap assembly, said retainer comprising:

an anchor body having a securement portion and a seat belt engagement portion, said securement portion being adapted for being releasably mountable upon a front panel of a vehicle passenger seat and said seat belt engagement portion adapted for releasable engagement with a seat belt assembly member;

said securement portion further comprises a buckle for releasably engaging a tongue insert of a seat belt strap assembly;

said buckle further comprises a push-button release for permitting disengagement of said tongue insert from said buckle;

said push-button release further comprises a ramp-shaped catch for insertion into a receiving aperture of said tongue insert; and said push-button release is spring biased toward a configuration for securement to said seat belt assembly member.

11. The retainer as recited in claim 10; wherein said buckle is positioned upon a top end of said anchor body opposite said securement portion.

12. A method for anchoring a motor vehicle passenger seat belt assembly when not in use, said method comprising:

installing an anchor body upon a front side panel of a vehicle passenger seat for releasable engagement thereupon, said anchor body having a securement portion and a seat belt engagement portion, said securement portion being adapted for being releasably mountable upon a front panel of a vehicle passenger seat and said seat belt engagement portion adapted for releasable engagement with a seat belt assembly member, said securement portion having a buckle for releasably engaging a tongue insert of the seat belt strap assembly member and said buckle further comprises a push-button release for permitting disengagement of the tongue insert from said buckle, said push-button release being spring biased toward a configuration for securement to the seat belt assembly member; and inserting a seat belt assembly member into a buckle of said securement portion of said retainer for securing a strap portion of said seat belt assembly across a top surface of said vehicle passenger seat.

13. The method as recited in claim 12; further comprising:

clipping said anchor body about a lower edge of said front side panel of said vehicle passenger seat.

14. The method as recited in claim 12; further comprising:

engaging at least one barb into said front side panel of said vehicle passenger seat thereby resisting inadvertent disengagement of said retainer from said front side panel of said vehicle passenger seat.

15. The method as recited in claim 12; further comprising:

tightening said strap portion of said seat belt assembly so that said seat belt assembly is drawn taut across said top surface of said vehicle passenger seat.

16. The method as recited in claim 12; further comprising:

constructing said anchor body so that said securement portion is substantially J-shaped with an interior leg adapted for abutting engagement with an interior surface of said front side panel of a vehicle passenger seat and an exterior leg adapted for abutting engagement with an exterior surface of said front side panel of the vehicle passenger seat; and pinching said front side panel of said vehicle passenger seat between said interior and exterior legs when said retainer is in a mounted configuration.

17. The method as recited in claim 16; further comprising:

positioning at least one barb upon one of said legs of said securement portion for biting engagement upon said front side panel of said a vehicle passenger seat when said retainer is in a mounted configuration.

* * * * *